United States Patent [19]

Coles

[11] E Re. 30,334

[45] Reissued Jul. 15, 1980

[54] PRESSURE COMPENSATED HERMETICALLY SEALED TRANSMISSION SYSTEM

[75] Inventor: Carl R. Coles, Michigan City, Ind.

[73] Assignee: Zero-Seal, Inc., Arlington Heights, Ill.

[21] Appl. No.: 774,590

[22] Filed: Mar. 7, 1977

Related U.S. Patent Documents

Reissue of:

[64] Patent No.: 3,933,052
Issued: Jan. 20, 1976
Appl. No.: 516,206
Filed: Oct. 21, 1974

[51] Int. Cl.[2] ..... F16J 15/50

[52] U.S. Cl. ..... 74/18.1

[58] Field of Search ..... 74/18.1; 308/211, 214

[56] References Cited

U.S. PATENT DOCUMENTS

| | | | |
|---|---|---|---|
| 2,255,172 | 9/1941 | Johnson | 74/18.1 |
| 2,454,340 | 11/1948 | Reichel | 74/18.1 |
| 2,568,226 | 9/1951 | Drake | 403/51 X |
| 2,647,025 | 7/1953 | Deffenbaugh | 308/211 |
| 2,826,919 | 3/1958 | Klingler | 74/18.1 |
| 2,860,933 | 11/1958 | Wolff | 74/18.1 |
| 3,049,931 | 8/1962 | Lang, Jr. et al. | 74/18.1 |
| 3,208,394 | 9/1965 | Taplin | 74/18.1 X |
| 3,416,379 | 12/1968 | Robbins | 74/18.1 |

FOREIGN PATENT DOCUMENTS

| | | | |
|---|---|---|---|
| 1099067 | 8/1955 | France | 74/18.1 |
| 290405 | 8/1953 | Switzerland | 74/18 |
| 482802 | 4/1958 | United Kingdom | 74/18.1 |
| 149281 | 8/1961 | U.S.S.R. | 74/18.1 |

*Primary Examiner*—Samuel Scott
*Assistant Examiner*—Wesley S. Ratliff, Jr.
*Attorney, Agent, or Firm*—Darbo & Vandenburgh

[57] ABSTRACT

A pressure compensated, hermetically sealed transmission system is described which includes, basically, a hermetic rotary coupling. Rotary motion is applied through a casing, wherein a cylindrically shaped input shaft having a circular inner bearing race affixed to one end is coupled to a generally spherical shaped wobble plate by means of roller or ball bearings. In similar fashion, an output shaft is similarly coupled to the spherical shaped wobble plate at the opposite end. The inner races of the shafts are positioned at an angle and located eccentrically from the respective shaft center line. Both shafts are supported at their outer ends by combination journal thrust bearings, which are coupled to the main casing. The wobble plate is prevented from rotating about the common axis of the two shafts. Thus, as one shaft rotates, the wobble plate rocks, due to [ball] bearing action, but does not rotate. Likewise, due to the bearing action, as the wobble plate rocks the output shaft rotates. Overall, a system is described which provides for equalization of pressure across imperforate flexible membranes which increase the reliability of the imperforate flexible membranes. *The disclosed means of equalization is* by providing for pressure feedback *from the working side* through a loop *to a confined body of sealing liquid* to insure equal pressure on both sides of the imperforate [flexable] *flexible* membranes so as to increase the integrity thereof. *There is provision for replacing the sealing liquid if it leaks.*

26 Claims, 1 Drawing Figure

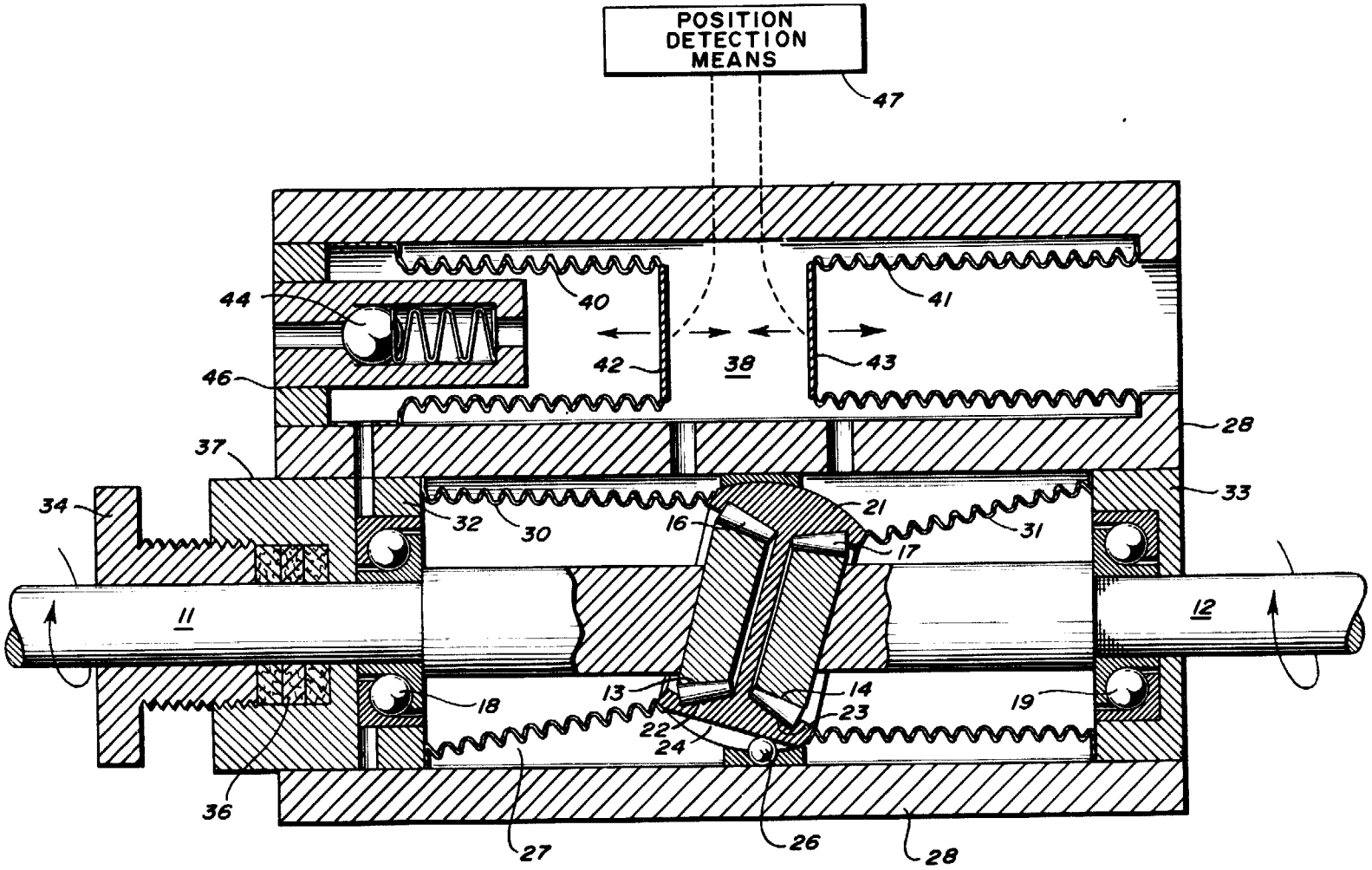
POSITION DETECTION MEANS
47
28
33
12
31
19
41
43
17
21
14
23
26
38
16
22
24
13
42
40
30
27
32
18
44
46
37
36
11
34

PRESSURE COMPENSATED HERMETICALLY SEALED TRANSMISSION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to pressure compensated hermetically sealed transmission systems. Accordingly, the general object of the invention is to provide new and improved systems of such character.

2. Description of the Prior Art

*The prior art shows a wide variety of hermetically sealed transmission means, in which a mechanical transmission means is sealed by a bellows or other diaphragm between a movable element of the transmission means and a surrounding wall. Although such seals have been known at least since 1938, official and private searches prior to this reissue application have not uncovered any suggestion of making the diaphragms for such devices more reliable by equalizing the pressures on the two sides thereof.*

In accordance with preliminary novelty searches performed on behalf of the applicant, specifically for the following concepts: (1) Bearings on both sides of a wobble plate, wherein as the wobble plate rocks, the output shaft rotates; and (2) [bellow] *bellows* systems with the foregoing, with pressure feedback through an upper loop to insure equal pressure on both sides of the bellows, the following patents of interest were found:

U.S. Pat. No. 2,119,955—LITTON
U.S. Pat. No. 2,137,303—NELSON
U.S. Pat. No. 2,770,139—SHEN et al
U.S. Pat. No. 2,771,787—RANSON
U.S. Pat. No. 2,779,197—EMBREE
U.S. Pat. No. 3,010,887—BAUMGARTEN et al
U.S. Pat. No. 3,028,761—COLE, JR.
U.S. Pat. No. 3,049,931—LANG, JR. et al
U.S. Pat. No. 3,424,017—HASQUENOPH et al

Litton U.S. Pat. No. 2,119,955 and Lang, Jr. et al., U.S. Pat. No. 3,049,931 combine the rocking type of action in a coupling with sealing means and in the case of the Litton patent with a bellows type of seal.

Cole, Jr. U.S. Pat. No. 3,028,761 also discloses use of wobble plates with bellows for hermetic sealing.

Nelson, U.S. Pat. No. 2,137,303, discloses rotating shafts with a bellows type of seal.

Baumgarten et al., U.S. Pat. No. 3,010,887, also discloses rotation of a shaft and the use of bellows seals.

Embree, U.S. Pat. No. 2,779,197, discloses bellows as seals with pressure compensation.

The remaining U.S. [patens] *patents* set forth above are further examples of bellows used as seals in rotary systems.

Other articles of interest include the following two publications:

1. "Look at Forged Valves for Nuclear" by A. K. Velan "Power" September 1973 pp. 44–45
2. "Operating Experience with Valves in Nuclear Power Plants," by K. H. Arriens. "Combustion" February 1974 pp. 31–36.

[No prior art was found suggesting the use of equalized pressure bellows sytems with rotating shafts.]

*Among patents found by the Examiner before allowing the original patent here being reissued, the most interesting was:*

*French Pat. No. 1,099,067 (1955) in which several diaphragms were used, various fills between them being suggested, but with no mention of pressurizing a fluid fill.*

*It is known to provide some degree of compensating pressure around a bellows that is pumping rather than sealing a transmission means, "to keep the differential pressures below the critical limit of the bellows".*

SUMMARY OF THE INVENTION

This invention includes a combination of concepts which provide a solution to the problem of hermetically sealing a motion or power transmitting device at high pressure. More specifically, the present invention finds application in high pressure stem seals for valves, actuators, indicators, pumps, and the like.

One feature of the invention involves a mechanical device for transmitting torque or rotary motion hermetically between two rotatable elements, where the two elements are physically separated into different pressure or fluid environments. The hermetic seal is achieved by using a flexible membrane, such as a bellows or a diaphragm to separate the two rotatable elements.

The second feature of the invention equalizes or minimizes the pressure across the sealing membrane or membranes by sealing with a liquid and a standard or conventional type shaft seal, such as a packing case, friction type mechanical seal, or a magnetic liquid, O-ring seal, while compensating for a change in liquid volume. The second feature also applies to any hermetic motion or power transmitting device using flexible sealing membranes other [then] *than* the first feature disclosed hereinabove, such as, but not limited to the patents cited above and linear motion or power transmission devices such as hermetically sealed bellows or diaphragm type valves.

One advantage of this invention permits the use of very thin and/or flexible imperforate membranes at high operating pressures by eliminating or drastically reducing the stress caused by the high pressure. The sealing membranes serve the purpose of separating and sealing against fluids not at high *differential* pressure.

Another advantage of this invention allows the use of many different types of materials for sealing membranes, such as very thin gauge metal, rubber, plastics, and the like which would normally be unsuitable to seal against high pressure.

Another advantage of this invention includes the use of very large and/or unusually shaped sealing membranes, such as cylindrical or tapered type bellows, bladders of all types, flat diaphragms, free floating pistons and the like.

Another advantage of this invention is to provide an opportunity for a seal comprised of standard, readily available and easily machined parts.

Thus, it is an object of this invention to provide a novel hermetic rotary coupling system, which is simple in design, utilizing symmetrical parts to facilitate manufacture.

Another object of this invention is to provide a novel power transmission device which provides rotary, torsional, or linear motion or power, while maintaining a true hermetic seal.

Another object of this invention is to provide a novel power transmission device which provides a high mechanical efficiency in the rotary seal by using shafts and bearings as the power transmitting members.

Yet another object of this invention is to provide a novel power transmission device which provides a rotary seal *and* that has negligible backlash for accurate positioning, regardless of direction or change of direction, such as for use in controls or control valves.

One object of this invention is to provide a novel power transmission device which utilizes a standard type seal to seal against pressure regardless of whether the [processing] *process* fluid is a gas or a liquid.

Further advantages of this invention include the provision of a means of adding [a] sealing fluid [which] *when needed, inasmuch as some sealing fluid* can leak through the standard seal without affecting the integrity of the hermetic seal containing the process fluid.

Other advantages include the following: A design that can easily have redundant seals and compartments to provide a backup seal in the event one of the sealing membranes fails or leaks; a hermetic seal is provided to transmit rotary or linear motion by utilizing external drivers or actuators that can be changed or repaired without affecting the integrity of the piping or vessel holding the process fluid; a hermetic seal can be provided that can sustain pressure surges without affecting the integrity of the hermetic seal; a sealing liquid can be used that can be easily cooled by various methods and still maintain a hermetic seal when the process fluid is at high temperatures; a hermetic seal can be provided that can be easily monitored to indicate a failure of an internal sealing membrane by monitoring the movement of the volume compensating sealing membrane; a hermetic seal can be provided to handle a variety of problem process fluids such as radioactive sodium, poisonous gases, expensive gases such as helium, flammable gas and corrosive fluids such as high pressure steam; a standard pressure seal can be separated from the process fluid to eliminate corrosion or other problems at the standard seal; multiple packing cases can be eliminated along with vacuum seal gas systems as used in conventional seals; and a hermetic seal can be provided that is reasonably compact although somewhat larger than a conventional type seal.

In accordance with one *aspect of the illustrated* embodiment of this invention a power transmission device includes a hermetically sealed chamber having a first opening in a first wall of the chamber. A second opening is provided in an opposing rear wall of the chamber. The two openings [having] *have* a common axis. A rigid transmission means, capable of being wobbled [and rotatably engaging the interior wall of the chamber], is arranged so as to wobble about a substantially fixed point which lies substantially along the common axis. A first flexible imperforate membrane engages the transmission means and seals the first opening. Likewise, a second flexible imperforate membrane engages the transmission means and seals the second opening. A rotatable driving member, external to the chamber, extends through the first opening of the chamber, whereas, a driven member, external to the chamber, extends through the second opening of the chamber. Means are provided for coupling the driving member to the transmission means for converting the rotary motion of the driving member into a wobbling motion of the transmission means. Means are provided for coupling the transmission means to the driven means for converting the motion of the transmission means into a rotating motion of the driven means.

In accordance with another [embodiment] *aspect* of the invention, a power transmission system device for transmitting power from an external environment to an internal environment includes a housing for separating the external environment from the internal environment. The housing has a first opening in a first wall which communicates with the external environment. The housing also has a second opening in an opposing rear wall which communicates with the internal environment. The two openings are aligned along a common axis and form the ends of a first chamber within the housing. A third opening in the first wall and a fourth opening in the rear wall [form] *open to* a second chamber within the housing. Transmission means within the first chamber of the housing are adapted to wobble about a fixed point which lies substantially in the common axis. A rotatable driving member extends from the external environment through the first opening of the housing. Means are provided for coupling the driving member to the transmission means for converting the rotary motion of the driving member into a wobbling motion of the transmission means. A first bearing housed within the first chamber supports the driving member. A driven member [external to the housing] extends from the internal environment through the second opening of the housing. Means are provided for [coupling the transmission means to the driven means for] converting the wobbling motion of the transmission means into a rotary motion of the driven means. A second bearing housed within the first chamber supports the driven member. A first flexible imperforate membrane engages the transmission means and seals the first opening at *(i.e., as to flow through)* the first bearing. Likewise, a second flexible imperforate membrane engages the transmission means and seals the second opening at the second bearing. A third flexible imperforate membrane affixed to an inner wall of the second chamber seals, in communication[,] *(i.e., without disturbing communication between them)* the third opening and a fifth opening which extends from the second chamber to the first bearing on the external environmental side [thereof] *of this third membrane*. A fourth flexible imperforate membrane is affixed to the inner wall of the second chamber and seals the fourth opening, while permitting a sixth opening to be unsealed between the first chamber and the second chamber. [Pressure sensitive means cover] *A check valve prevents outflow through* the third opening.

In accordance with yet another [embodiment] *aspect* of the invention, apparatus for detecting the reliability of a hermetically sealed torque transmission system, wherein the system includes a first shaft extending from an external environment into the system and a second shaft extending from an internal environment therein, includes a [first] housing *supplemental to the transmission system* which extends from the external environment to the internal environment and [forming] *forms* a chamber therewithin. The housing includes a first opening *(which has designated as the third opening in the previous paragraph)* at an external environmental side thereof, a second opening at an internal environmental side thereof, and a third opening extending [through] to the interior of the *transmission* system. A first flexible imperforate diaphragm engages an inner wall of the chamber and seals the first opening. A second flexible imperforate diaphragm engages the inner wall of the chamber and seals the second opening, whereby the [diaphragm] *diaphragms* jointly seal the third opening from normally free communication with either of said first or second openings. A [pressure checking means covers] *check valve prevents flow of liquid out through* the first opening. [whereby, with constant pressures in said external and internal environments, a change in chamber volume] *Changes in positions of the last mentioned diaphragms* (detected by [said pressure checking] *the "position detection* means" *47)* [occurs] *occur* upon one or more of [the following] *various failure* conditions[: (1) a leak or rupture of the first flexible imperforate diaphragm; (2) a leak or rupture at the second flexible imperforate diaphragm; (3) failure of seal at the first opening by said pressure checking means; or (4) failure of reliability the hermetically sealed torque transmission system], *the most common of which would be gradual seepage of sealing liquid past the seal illustrated as conventional packing 36.*

BRIEF DESCRIPTION OF THE DRAWINGS

Other objects, advantages, and features of this invention will become more apparent from the following specification, when read in conjunction with the accompanying drawing, in which: the FIGURE is a cross sectional diagram of one embodiment of the invention.

DESCRIPTION OF A PREFERRED EMBODIMENT OF THE INVENTION

Referring to the FIGURE, which is a longitudinal cross-section illustrating, in diagrammatic view, one embodiment of the invention, there is shown an input or driving shaft 11 and an output or driven shaft 12, each of which has a circular inner bearing race 13, 14, respectively, attached or machined on the ends of the shafts, respectively, for bearings 16, 17, respectively. These inner races 13, 14 are positioned at an angle and located eccentrically from the common center axis of the shafts 11, 12. Both shafts 11, 12, are positioned and supported at their outer ends by typical combination journal thrust bearings 18, 19. Though the bearings 16, 17 are illustrated as *tapered* roller bearings, ball or other type of bearings can be used in lieu thereof.

*However, tapered roller bearings are preferred, not only for an exceptional use of the usual advantages of such bearings, but for a new advantage inherent in the illustrated arrangement. As is apparent from a study of the drawings, the tapered roller bearings have a double action; they exert a wobble-inducing or wobble-induced thrust substantially axially, and also a cranking action, due to eccentricity, by a thrust substantially in a radial plane. It is apparent that great ruggedness and precision can be achieved.*

A wobble plate 21 is machined from a solid ball so as to hold and become the outer bearing races 22, 23 for the bearings 16, 17. A slot 24 is machined into the spherical surface of the wobble plate 21 and is positioned by a ball or guide member 26 which acts to inhibit the wobble plate 21 from rotating, but not from wobbling in the main bore 27 of the main casing or housing 28.

As rotary motion is applied to the input or driving shaft 11, such motion is transferred through [to] the wobble plate 21 to the output or driving shaft 12. Such action occurs due to the direct moment provided by the eccentrically located inner bearings races 13, 14, and due to a wedging action caused or contributed by the angle of the shafts 11, 12 with respect to the wobble plate 21.

Flexible imperforate membranes, such as flexible diaphragms or bellows 30, 31, are attached to the wobble plate 21 and to its respective journal thrust bearing support 32, 33. A packing gland 34, packing 36, and a packing case 37 together act as a standard shaft packing seal although a mechanical or magnetic fluid shaft seal may serve a similar purpose.

A separate bore 38 in the casing 28 has flexible imperforate membranes such as flexible diaphragms or bellows 40, 41 located therein. The bellows 40 encloses the leftmost portion of the bore 38, while the bellows 41 encloses the rightmost portion of the bore 38. These bellows 40, 41 have end plates 42, 43, respectively, which act to form a seal for the center portion of the bore 38, and thus provide two separate cavities or chambers from the pressurized side of the output shaft seal to the opposite side of the input shaft seal. One cavity includes that space (at the top left of the drawing) enclosed by the bellows 40, the left passageway (unnumbered) leading to the journal thrust bearing 18, and the space enclosed (bottom left of the drawing) by the bellows 30. The other cavity includes that space in the separate bore 38 (at the top center of the drawing) outside of the bellows 40, 41. The two vertical passageways [(unnumbere] *(unnumbered)* and that space in the main bore 27 which lies outside of the bellows 30, 31 form a portion of such other cavity. These cavities or chambers are filled with any suitable liquid or lubricant depending upon the temperature, pressure and duty of the seal. The journal thrust bearings 18, 19 are not seals and, hence, fluid is permitted to flow into the bellows or flexible membranes 30, 31. The journal thrust bearing 19 permits the process gas or liquid being sealed to enter into the bellows or flexible membrane 31 and encompass the bearing races 14, 23.

As pressure is applied to the inside of the bellows or flexible membranes 31, 41 by the process fluid, it is equalized by the *confined body of* liquid throughout the central cavity or chamber consisting of the volume on the outside of all four bellows or flexible membranes 30, 31, 40, 41. *As seen in the drawing, bellows 41 is free to expand to keep the sealing liquid under the same pressure as the process fluid.* Pressure is transmitted by the liquid through the bellows or flexible membrane 40 [through] *to a second body of sealing fluid in* the cavity or chamber consisting of the inside of the bellows or flexible membranes 40 and 30. This eliminates stress due to differential pressure across all the bellows or flexible membranes 30, 31, 40, 41.

As the sealing liquid leaks *(usually very slowly)* through the packing 36, the bellows or flexible membranes 40, 41 move to compensate for the loss of liquid by [reducing the] *transmitting the pressure of the process fluid to it in spite of its reduced* volume of liquid. Such movement can be monitored to indicate packing leakage. The relative movement of bellows or flexible membranes 40, 41 to each other can *also* be monitored to indicate an internal leak [or membrane failure and where the leak is located].

A [pressure checking means, including a] standard [ball] check valve 44[, covers] *(ball type being shown) prevents outflow through* an opening 46 in the main casing, which opening 46 is enclosed by the bellows 40.

[With constant pressures on either the external or internal environments on both sides of the housing 28, a] *A* change in [pressure] *position* indicated by the [pressure checking] *position detection* means *47* occurs upon one or more of the following conditions: (1) a leak [or rupture] of the bellows 40; (2) a leak [of rupture]

of the bellows 41; (3) failure of seal of the check valve 44 of the opening 46 *or seepage of the sealing fluid past the conventional seal 36*; or, (4) failure of reliability of the hermetically sealed torque transmission system overall shown in the FIGURE, *as by leakage through bellows 30 or 31.*

Although a standard ball check valve 44 is depicted in the FIGURE, other check valves can be used in lieu thereof. The check valve 44 permits additional sealing liquid to be added to the system while the seal is operating to compensate for any leakage that may occur through the packing 36.

The [pressure checking means, desirably, further includes a] position detection means 47 *is* for detecting the positions of the end plates 42, 43 of the bellows 40, 41. Such position detection means 47 may be optical, mechanical, magnetic, electrical, or any combination thereof[, in character, depending upon the process fluids involved]. The side wall of the casing 28 may be transparent, in certain applications, so that the positions of the end plates may be optically viewed. Desirably, however, *an* automatic alarm system should be provided, such as an electrical system, to reduce operator error.

It will be appreciated by those skilled in the art that several concepts described herein can be used either separately or in combination with each other. For example, *in addition, perhaps, to concepts noted under "SUMMARY OF THE INVENTION"*, one concept involves the tranmission of power by a driving shaft to a drive shaft using a wobble plate for the conversion of rotary power to wobbling motion, and from wobbling motion to rotary motion, whereas another concept [invloves] *involves* an apparatus for detecting [the reliability] *leakage* of the hermetically sealed [torque] transmission system [utilizing pressure checking means in a combination apparatus as set forth more specifically in the appended claims].

It will be appreciated that many variations may be performed without departing from the spirit and scope of this invention. In particular, various materials may be used for bellows, or membranes, depending upon the environmental conditions. Bellows or membranes can be formed of rubber, plastic, metal and the like. Likewise, the bellows or membranes need not form any specific configuration; other types of diaphragms can be used in lieu thereof.

*ACHIEVEMENT*

*According to the present invention, an exceedingly safe seal system is provided for a valve rod or other movable means extending into a process environment. A pressure-equalized membrane or diaphragm provides hermetic sealing, freed from high differential pressures which could cause rupture and freed from previous danger of rapid escape of any dangerous substances in the working environment if rupture should occur. Because the outer seal by which the external balancing pressure is maintained on the membrane is not of the membrane type (and hence not a hermetic seal) it can be of a standard type such as is, by nature, virtually rupture-proof. The illustrated standard packing, for example, is known to be capable of withstanding high differential pressures even though not dependably hermetic. This makes protection of the membrane dependable so long as such sealing liquid as leaks past the outer seal is occasionally replenished; means preferably being provided for observation or other detection of the amount of said leakage. Virtually exact pressure equalization is ensured by exposing the sealing liquid outside of the hermetic membrane to the same pressure to which the inside of the hermetic membrane is exposed, this same pressure being transmitted with flexible hermetic separation to avoid contamination of the sealing liquid. Also, an improved wobble-type drive transmission means is provided in case rotary transmission is needed.*

What is claimed is:

1. A power transmission device comprising a. a hermetically sealed chamber having *an interior surface*, a first opening in a first wall of said chamber, and a second opening in an opposing rear wall of said chamber, said openings having a common axis;

b. rigid transmission means, capable of being wobbled, nonrotatably engaging the interior [wall] *surface* of said chamber, said transmission means being arranged to wobble about a substantially fixed point lying substantially along said common axis;

c. a first flexible imperforate membrane engaging said transmission means and sealing said first opening;

d. a second flexible imperforate membrane engaging said transmission means and sealing said second opening;

e. a rotatable driving member external to said chamber and extending through said first opening of said chamber;

f. a driven member external to said chamber and extending through said second opening of said chamber;

g. means coupling said driving member to said transmission means for converting the rotary motion of said driving member into a wobbling motion of said transmission means; and h. means coupling said transmission means to said driven means for converting the motion of said transmission means into a rotating motion of said driven means.

2. A power transmission device for transmitting power from an external environment to an internal environment comprising a. a housing for separating said external environment from said internal environment, said housing having a first opening in a first wall communicating with said external environment, said housing having a second opening in an opposing rear wall communicating with said internal environment, said openings being aligned along a common axis and forming the ends of a first chamber within said housing, a third opening in said first wall and a fourth opening in said rear wall forming a second chamber within said housing;

b. transmission means within said first chamber of said housing being adapted to wobble about a fixed point lying substantially in said common axis;

c. a rotatable driving member extending from said external environment through said first opening of said housing;

d. means coupling said driving member to said transmission means for converting the rotary motion of said driving member into a wobbling motion of said transmission means;

e. a first bearing housed within said first chamber for supporting said driving member;

f. a driven member external to said housing and extending from said internal environment through said second opening of said housing;

g. means coupling said transmission means to said driven means for converting the wobbling motion of said transmission means into rotary motion of said driven means;

h. a second bearing housed within said first chamber for supporting said driven member;

i. a first flexible imperforate membrane engaging said transmission means and sealing said first opening at said first bearing;

j. a second flexible imperforate membrane engaging said transmission means and sealing said second opening at said second bearing;

k. a third flexible imperforate membrane affixed to an inner wall of said second chamber and sealing in communication said third opening and a fifth opening extending from said second chamber to said first bearing on the external environmental [aide] *side* thereof;

l. a fourth flexible imperforate membrane affixed to said inner wall of said second chamber and sealing said fourth opening, while permitting a sixth opening to be unsealed between said first chamber and said second chamber; and m. pressure sensitive means covering said third opening.

3. Apparatus for [detecting] *enhancing* the reliability of a hermetically sealed torque transmission system, wherein said system includes a first shaft extending from an external environment into said system, and a second shaft extending from an internal environment into said system, comprising a. a housing extending from said external environment to said internal environment, and forming a chamber therewithin including 1. a first opening at an external environmental side thereof; *and*

2. a second opening at an internal environmental side thereof; [and]

[3. a third opening extending through to the interior of said system;]

b. a first flexible imperforate diaphragm engaging an inner wall of said chamber and sealing said first opening;

c. a second flexible imperforate diaphragm engaging said inner wall of said chamber and sealing said second opening, [whereby] said diaphragms jointly *operating to* seal [said third opening] *the space between them* from normally free communication with either of said first or second openings; and d. [pressure checking] *sealing* means [covering] *for* said first opening, [whereby with constant pressure in said external and internal environments,] *and detection means for detection of* a change in [pressure detected by said pressure checking means] *status which* occurs upon [one or more of the following conditions;]

[1. a leak or rupture of said first flexible imperforate diaphragm;]

[2. a leak or rupture of said second flexible imperforate diaphragm;]

[3.] failure of seal of said first opening [by said pressure indicating means; or] *sealing means.*

[4. failure of reliability of said hermetically sealed torque transmission system.]

4. Apparatus as recited in claim 3, wherein fluid can be added [via said pressure checking means] to *the space on the external-environment side of said first diaphragm to* compensate for fluid loss from said housing.

5. Apparatus as recited in claim 2 wherein fluid can be added via said pressure sensitive means to compensate for fluid loss past said first bearing.

*6. Apparatus as recited in claim 2 wherein a non-hermetic seal capable of withstanding high differential pressures movably seals said driving member, sealing liquid is confined on the external-environment side of all of said diaphragms, and said pressure sensitive means is a check valve through which sealing liquid may be supplied to compensate for fluid loss past said non-hermetic seal.*

*7. A power transmission device comprising*

*a. a seal chamber having an interior surface a first opening in a first wall of said chamber, and a second opening in an opposing rear wall of said chamber, said openings having a common axis;*

*b. rigid transmission means, capable of being wobbled, nonrotatably engaging the interior surface of said chamber, said transmission means being arranged to wobble about a susbstantially fixed point lying substantially along said common axis;*

*c. a flexible imperforate membrane engaging said transmission means and with it hermetically sealing one said opening;*

*d. a rotatable driving member external to said chamber and extending through said first opening of said chamber;*

*e. a driven member external to said chamber and extending through said second opening of said chamber;*

*f. means coupling said driving member to said transmission means for converting the rotary motion of said driving member into a wobbling motion of said transmission means; and*

*g. means coupling said transmission means to said driven member for converting the motion of said transmission means into a rotating motion of said driven member.*

*8. A power transmission device for transmitting power from an external environment to an internal environment comprising*

*a. a housing for separating said external environment from said internal environment, said housing having a first opening in a first wall communicating with said external environment, said housing having a second opening in an opposing rear wall communicating with said internal environment, said openings being aligned along a common axis and forming the ends of a chamber within said housing, a third opening into said housing from the external environment and a fourth opening into said housing from the internal environment;*

*b. transmission means within said chamber of said housing being adapted to wobble about a fixed point lying substantially in said common axis;*

*c. a rotatable driving member extending from said external environment through said first opening of said housing;*

*d. means coupling said driving member to said transmission means for converting the rotary motion of said driving member into a wobbling motion of said transmission means;*

*e. a first bearing housed within said chamber for supporting said driving member;*

*f. a driven member external to said housing and extending from said internal environment through said second opening of said housing;*

*g. means coupling said transmission means to said driven member for converting the wobbling motion of said transmission means into rotary motion of said driven member;*

*h. a second bearing housed within said chamber for supporting said driven member;*

*i. a first flexible imperforate membrane engaging said transmission means and sealing said first opening as to flow through said first bearing;*

*j. a second flexible imperforate membrane engaging said transmission means and sealing said second opening as to flow through said second bearing;*

*k. a third flexible imperforate membrane affixed to an inner wall of said housing and sealing said third opening while leaving communication from it to said first bearing on the external environmental side of the first membrane;*

*l. a fourth flexible imperforate membrane affixed to said inner wall of said housing and sealing said fourth opening, while permitting communication between the space of said chamber between the first and second membranes and the space between the third and fourth membranes;*

*m. means preventing outflow through said third opening; and*

*n. a rotary seal for said driven member, of a type not dependably hermetic, but suitable for normally retaining a liquid sealant from flowing out through the first bearing.*

*9. A power transmission device for transmitting power from an external environment to an internal environment comprising*

*a. a housing for separating said external environment from said internal environment, said housing having a first opening in a first wall communicating with said external environment, said housing having a second opening in an opposing rear wall communicating with said internal environment, said openings being aligned along a common axis and forming the ends of a chamber within said housing, and a third opening into said housing from the internal environment;*

*b. transmission means within said chamber of said housing being adapted to wobble about a fixed point lying substantially in said common axis;*

*c. a rotatable driving member extending from said external environment through said first opening of said housing;*

*d. means coupling said driving member to said transmission means for converting the rotary motion of said driving member into a wobbling motion of said transmission means;*

*e. a first bearing housed within said chamber for supporting said driven member;*

*f. a driven member external to said housing and extending from said internal environment through said second opening of said housing;*

*g. means coupling said transmission means to said driven member for converting the wobbling motion of said transmission means into rotary motion of said driven member;*

*h. a second bearing housed within said chamber for supporting said driven member;*

*i. a first flexible imperforate membrane engaging said transmission means and sealing said first opening as to flow through said first bearing;*

*j. a second flexible imperforate membrane engaging said transmission means and sealing said second opening as to flow through said second bearing;*

*k. a third flexible imperforate membrane affixed to an inner wall of said housing while leaving communication from one side of it to said first bearing on the external environmental side of the first membrane;*

*l. a fourth flexible imperforate membrane affixed to said inner wall of said housing and sealing said third opening, while permitting communication between the space of said chamber between the first and second membranes and the space between the third and fourth membranes;*

*m. means preventing outflow through said third opening; and*

*n. means for detection of the positions of said third and fourth membranes whereby movement of the third membrane will show leakage of said rotary seal, and movement of the fourth membrane different from movement of the third membrane will show membrane leakage.*

*10. A sealed transmission device for performing a function in a hermetically sealed working environment in response to a force applied in the external environment comprising:*

*a. a seal chamber having a first opening, for exposure to the external environment; and a second opening, for exposure to the working environment;*

*b. a movement transmission means extending movably through both openings;*

*c. an imperforate flexible membrane sealed to the transmission means and to the chamber walls; and with the transmission means forming a hermetic seal separating said openings;*

*d. a body of sealing liquid confined within the chamber on the external side of the membrane by a pressure-withstanding seal for the transmission means to maintain pressure on the external side of the membrane to neutralize pressure on the working side of said membrane;*

*e. said device including a pressure-equalizing means movable by virtue of hermetically sealed membrane means substantially unaffected by movement of the transmission means but movable by any differential pressures between the fluids on the two said sides for maintaining the confined sealing liquid always at the pressure of the working side.*

*11. A sealed transmission device for performing a function in a hermetically sealed working environment in response to a force applied in the external environment comprising:*

*a. a seal chamber having a first opening, for exposure to the external environment; and a second opening, for exposure to the working environment;*

*b. a movement transmission means extending movably through both openings;*

*c. an imperforate flexible membrane sealed to the transmission means and to the chamber walls; and with the transmission means forming a hermetic seal separating said openings;*

*d. a body of sealing liquid confined within the chamber on the external side of the membrane by a pressure-withstanding seal for the transmission means to maintain pressure on the external side of the membrane to neutralize pressure on the working side of said membrane;*

*e. said device including a pressure-equalizing means movable by virtue of hermetically sealed membrane means substantially unaffected by movement of the transmission means but movable by any differential pressures between the fluids on the two said sides for*

*maintaining the confined sealing liquid always at the pressure of the working side; and*

*f. means for replenishing liquid to the confined body of liquid in the event of leakage from it.*

*12. A sealed power transmission device for performing a function in a hermetically sealed working environment in response to a force applied in the external environment comprising:*

*a. a seal chamber having a first opening, for exposure to the external environment; and a second opening, for exposure to the working environment;*

*b. a transmission means extending movably through both openings;*

*c. an imperforate flexible membrane sealed to the transmission means and to the chamber walls; and with the transmission means forming a hermetic seal between said openings;*

*d. pressure-withstanding seal means external of said membrane for sealing between said movable transmission means and said first opening;*

*e. sealing liquid confined within the chamber on the external side of the membrane to maintain the pressure on the external side of the membrane equal to the pressure on the working side of said membrane;*

*f. said device including a pressure-equalizing means movable by virtue of hermetically sealed membrane means substantially unaffected by movement of the transmission means but movable by any differential pressures between the fluids on the two sides for maintaining the confined liquid at the pressure of the working side.*

*13. A sealed power transmission device for performing a function in a hermetically sealed working environment in response to a force applied in the external environment comprising:*

*a. a seal chamber having a first opening, for exposure to the external environment; and a second opening, for exposure to the working environment;*

*b. a transmission means extending movably through both openings;*

*c. an imperforate flexible membrane sealed to the transmission means and to the chamber walls; and with the transmission means forming a hermetic seal between said openings;*

*d. pressure-withstanding seal means external of said membrane for sealing between said movable transmission means and said first opening;*

*e. sealing liquid confined within the chamber on the external side of the membrane to maintain the pressure on the external side of the membrane equal to the pressure on the working side of said membrane;*

*f. said device including a pressure-equalizing means movable by virtue of hermeticaly sealed membrane means substantially unaffected by movement of the transmission means but movable by any differential pressures between the fluids on the two sides for maintaining the confined liquid at the pressure of the working side; and*

*g. means for replenishing liquid to the confined sealing liquid in the event of leakage from it, and detection means for determining the need for such replacement.*

*14. A sealed power transmission device for performing a function in a hermetically sealed working environment in response to a force applied in the external environment comprising:*

*a. a seal chamber having a first opening, for exposure to the external environment; and a second opening, for exposure to the working environment;*

*b. a transmission means extending movably through both openings;*

*c. an imperforate flexible membrane sealed to the transmission means and to the chamber walls; and with the transmission means forming a hermetic seal between said openings;*

*d. pressure-withstanding seal means external of said membrane for sealing between said movable transmission means and said first opening;*

*e. sealing liquid confined within the chamber on the external side of the membrane to maintain the pressure on the external side of the membrane equal to the pressure on the working side of said membrane;*

*f. said device including a pressure-equalizing means movable by virtue of hermetically sealed membrane means substantially unaffected by movement of the transmission means but movable by any differential pressures between the fluids on the two sides for maintaining the confined liquid at the pressure of the working side; and*

*g. means for replenishing liquid to the confined sealing liquid in the event of leakage from it, and detection means for determining the need for such replacement, comprising position detection means responsive to movement of a pressure-equalizing means which moves as sealing liquid leaks through said seal for the first opening to maintain on the residual sealing liquid a pressure equal to the working pressure.*

*15. A hermetically sealed transmission device for transmitting rotary motion including a drive shaft, a driven shaft coaxial therewith, and means drivingly coupling the shafts including a transmission means of rigid nature restrained against rotation but free to wobble, flexible diaphragm means cooperating with the transmission means to provide a hermetic seal between the shafts, and a tapered bearing assembly coupling each shaft to the transmission means, each bearing assembly having its axis at a small angle to the associated shaft axis, in a relationship such that the turning of the drive shaft causes a wobbling of the transmission means, which in turn causes a turning of the driven shaft which duplicates the turning of the drive shaft.*

*16. A hermetically sealed transmission device for transmitting rotary motion including a drive shaft, a driven shaft coaxial therewith, and means drivingly coupling the shafts including a transmission ring, flexible diaphragm means cooperating with the transmission ring to provide a hermetic seal between the shafts, and a tapered bearing assembly coupling each shaft to the transmission ring, each bearing assembly being eccentric to the common shaft axis, in a relationship such that the turning of the drive shaft causes a movement of the transmission ring, which in turn causes a turning of the driven shaft which duplicates the turning of the drive shaft.*

*17. A hermetically sealed transmission device for transmitting rotary motion including a drive shaft having along its periphery an eccentric bearing surface which is circular about an axis slightly tilted from the shaft axis, a driven shaft coaxial therewith and having a like end member, and means drivingly coupling the shafts including a wobble element of rigid nature maintaining a 180° displacement between the eccentricities of the two end members, restrained against rotation but free to wobble, flexible diaphragm means cooperating with the wobble element to provide a hermetic seal between the shafts, and having bearing means in bearing relationship with the peripheral bearing surface of each shaft end member and coupling the shaft to the wobble element, each said peripheral bearing surface and bearing means having a common axis at a*

*small angle to the associated shaft axis, in a relationship such that the turning of the drive shaft and its eccentric end member causes a wobbling of the wobble element about a stationary point on the common axis of the shafts, which in turn causes a turning of the driven shaft which duplicates the turning of the drive shaft.*

*18. A power transmission device according to claim 1, in which each coupling means is of a type exerting an orbiting thrust directed substantially axially against the member it actuates.*

*19. A power transmission device according to claim 1, in which each coupling means is of a typewhich exerts both an orbiting thrust directed substantially axially and a thrust directed substantially in a radial plane against the member it actuates.*

*20. A sealed transmission device in situ, namely in conjunction with apparatus having a working environment therein to be sealed reliably from the external environment, expected to exhibit substantial pressure, and within which a function is to be performed by the transmission device; said transmission device including:*

*a. a seal housing having an opening exposed at its outer end to the external environment;*

*b. a movement transmission means extending movably through said opening;*

*c. an impervious flexible membrane cooperating with said housing and transmission means to allow said transmission means to perform a function in the working environment while forming a hermetic seal between the working environment and said opening; said membrane being subject to movement by the transmission means;*

*d. a pressure-withstanding seal preventing substantial leakage through said opening while permitting movement of the transmission means;*

*e. a body of sealing liquid confined between the external side of the membrane and the opening to maintain pressure on the external side of the membrane to neutralize pressure on the working side of the membrane;*

*f. said device including an isolative type of pressure-transmitting means for transmitting to said body of sealing liquid the pressure of the working environment while isolating the body from the working environment and leaving substantially unaffected the function-performing movements of the transmission means.*

*21. A sealed transmission device in situ according to claim 20, in which the device includes facilities for replenishing the body of sealing liquid in the event of depletion by leakage past the pressure-withstanding seal.*

*22. A sealed transmission device in situ according to claim 20, in which the device includes means for detecting leakage of liquid from the body of sealing liquid.*

*23. A sealed transmission device in situ according to claim 20, in which the device includes means for detecting leakage of liquid from the body of sealing liquid and for replenishing the body of sealing liquid in that event.*

*24. A power transmission device comprising*

*a. a seal chamber having an interior surface, a first opening in a first wall of said chamber, and a second opening in an opposing rear wall of said chamber, said openings having a common axis;*

*b. rigid transmission means, capable of being wobbled, nonrotatably engaging the interior surface of said chamber, said transmission means being arranged to wobble about a substantially fixed point lying substantially along said common axis;*

*c. a flexible imperforate membrane engaging said transmission means and with it hermetically sealing one said opening;*

*d. a rotatable driving member external to said chamber and extending through said first opening of said chamber;*

*e. a driven member external to said chamber and extending through said second opening of said chamber;*

*f. means coupling said driving member to said transmission means for converting the rotary motion of said driving member into a wobbling motion of said transmission means; and*

*g. means coupling said transmission means to said driven member for converting the motion of said transmission means into a rotary motion of said driven member;*

*the means coupling the transmission means to the driving member and to the driven member being tapered bearings.*

*25. A power transmission device comprising*

*a. a seal chamber having an interior surface, a first opening in a first wall of said chamber, and a second opening in an opposing rear wall of said chamber, said openings having a common axis;*

*b. rigid transmission means, capable of being wobbled, nonrotatably engaging the interior surface of said chamber, said transmission means being arranged to wobble about a substantially fixed point lying substantially along said common axis;*

*c. a flexible imperforate membrane engaging said transmission means and with it hermetically sealing one said opening;*

*d. a rotatable driving member external to said chamber and extending through said first opening of said chamber;*

*e. a driven member external to said chamber and extending through said second opening of said chamber;*

*f. means coupling said driving member to said transmission means for converting the rotary motion of said driving member into a wobbling motion of said transmission means; and*

*g. means coupling said transmission means to said driven member for converting the motion of said transmission means into a rotary motion of said driven member;*

*the means coupling the transmission means to the driving member and to the driven member being of a type which exerts an orbiting thrust directed substantially axially against the member it actuates.*

*26. A power transmission device comprising*

*a. a seal chamber having an interior surface, a first opening in a first wall of said chamber, and a second opening in an opposing rear wall of said chamber, said openings having a common axis;*

*b. rigid transmission means, capable of being wobbled, nonrotatably engaging the interior surface of said chamber, said transmission means being arranged to wobble about a substantially fixed point lying substantially along said common axis;*

*c. a flexible imperforate membrane engaging said transmission means and with it hermetically sealing one said opening;*

*d. a rotatable driving member external to said chamber and extending through said first opening of said chamber;*

*e. a driven member external to said chamber and extending through said second opening of said chamber;*

*f. means coupling said driving member to said transmission means for converting the rotary motion of said*

*driving member into a wobbling motion of said transmission means; and*

*g. means coupling said transmission means to said driven member for converting the motion of said transmission means into a rotary motion of said driven member;*

*the means coupling the transmission means to the driving member and to the driven member being of a type which exerts both an orbiting thrust directed substantially axially and a thrust directed substantially in a radial plane against the member which it actuates.*

* * * * *

UNITED STATES PATENT AND TRADEMARK OFFICE

CERTIFICATE OF CORRECTION

PATENT NO. : Re 30,334

DATED : July 15, 1980

INVENTOR(S) : Carl R. Coles

It is certified that error appears in the above-identified patent and that said Letters Patent are hereby corrected as shown below:

In claim 9, subparagraph e, second line, (column 11 line 53) "driven" should be "driving".

In claim 19, second line (column 15 line 12) "typewhich" should be "type which".

Signed and Sealed this

*Sixteenth* Day of *December 1980*

[SEAL]

*Attest:*

SIDNEY A. DIAMOND

*Attesting Officer*

*Commissioner of Patents and Trademarks*